United States Patent [19]

Decker

[11] 4,336,668

[45] Jun. 29, 1982

[54] METHOD FOR PRODUCING GROUND COVER SODS

[76] Inventor: Henry F. Decker, 4751 Stover Rd., Ostrander, Ohio 43061

[21] Appl. No.: 229,545

[22] Filed: Jan. 29, 1981

[51] Int. Cl.³ .............................................. A01G 17/00
[52] U.S. Cl. ............................................. 47/58; 47/9; 47/56; 111/1
[58] Field of Search .......................... 47/56, 5.5, 9, 58; 111/1

[56] References Cited

U.S. PATENT DOCUMENTS

| | | | |
|---|---|---|---|
| 2,902,795 | 9/1959 | Heigl et al. | 47/58 |
| 3,863,388 | 2/1975 | Loads | 47/56 |

FOREIGN PATENT DOCUMENTS 1322148   7/1973   United Kingdom ................... 47/5.5

OTHER PUBLICATIONS

Modern Farmers' Cyclopedia of Agriculture, Wilcox, 1952, Orange Judd Publ. Co., Inc.; N.Y. p. 244, col. 1.

Sewage Sod System Saves Time, Decker, 1975, Weeds, Trees, and Turf, 14 (6) : 40-41.
Producing Ground Cover Sod in a Sod-like Manner, Sterrett, 1976, M.S. Thesis, Ohio State Univ., Columbus, Ohio.

*Primary Examiner*—Robert E. Bagwill

[57] ABSTRACT

A novel method is proposed for growing ground covers as sods. Advantage is taken of the growth habits of these types of plants to grow and expand laterally by planting them in permanent row/hill nurseries between which is placed plastic sheeting covered with an appropriate growing medium. The row/hill nurseries grow laterally into these areas and knit the growing medium into a sod which is harvested by cutting along the edge of the plastic sheeting. The latter may be harvested with the sod to protect it in shipment or left behind in place, covered with more growing medium, and the process repeated. The method, in comparison to the conventional method of planting ground covers by rooted cuttings one at a time, requires less labor to install, provides instant weed-free cover complete with mulch, and requires less watering and initial care.

4 Claims, No Drawings

METHOD FOR PRODUCING GROUND COVER SODS

BACKGROUND OF THE INVENTION

In conjunction with research I began in 1968 on the feasibility of growing grass sods over plastic sheeting using contrived media, it occurred to me that it might be possible to design a method by which ground covers could also be grown as sods like turfgrasses. By ground covers I mean plants such as Ivy, Ajuga, Pachysandra, Euonymous, Vinca, and many other usually low growing, dicot creepers or spreaders that are used frequently in place of grasses, particularly in shady areas, by landscapers. I mentioned this idea in a 1975 article I wrote for the trade magazine "Weeds, Trees, and Turf".

It can easily be surmised that ground covers will root sufficiently to form and bind into a sod by simply observing the plastic flats filled with ground covers in a retail nursery. Ivy and Pachysandra, for example, are frequently sold in small plastic trays or flats containing a suitable growing medium into which 6 or more cuttings have been inserted or stuck. If these cuttings are cared for yet left long enough in the plastic trays without being sold, it can be shown readily that they will knit into a sod: one can remove from the plastic flats all of the cuttings, roots intertwined with the growing medium, in one piece—hence a sod.

The rooting capacity of Ivy was further confirmed by a student of mine who subsequently used the project to obtain an M.S. degree in Horticulture at Ohio State University. Cuttings of Ivy were simply stuck into wooden flats containing appropriate growing media placed over plastic sheeting, that is, essentially the same as growing it in plastic trays or flats. These were maintained under mist conditions in a greenhouse and after several weeks the cuttings, as expected just as in plastic trays in a retail nursery, rooted sufficiently to bind and knit the flat into a sod. Because of the extensive hand labor involved in sticking the cuttings, the repeated cost of the cuttings, and the special greenhouse conditions required, there was no commercial significance to these observations, that is no economic advantage over the conventional landscape system of establishing ground cover beds from rooted cuttings. For the grower it was much more profitable, given the premium of greenhouse space, to sell individual rooted cuttings rather than to wait for the cuttings in a plastic flat to mature into a knitted sod.

It occurred to me however that perhaps a novel growing system could be devised to minimize or to eliminate altogether the extensive hand labor, the repeated cost of cuttings, and the expense of greenhouse culture, and yet still produce a ground cover sod of commercial significance.

Many techniques were considered and tried and found unsuccessful until I conceived a novel, workable, process, described below, which I demonstrated in a series of experiments on my farm in Ostrander, Ohio. The results of the 1978 experiments were submitted as a Document Disclosure to the Patent Office and dated 8 Feb., 1979; and I further supported, expanded, and refined my novel growing process during the 1979 and 1980 growing seasons.

SUMMARY OF THE INVENTION

A novel growing system is presented for producing ground cover sods. The process takes advantage of the natural growth habit of these types of plants to grow and spread laterally. The ground cover from which a sod is desired is planted in narrow rows which are hilled to facilitate drainage. These row/hill plantings will become permanent nurseries. Plastic sheeting, the same width as the width of finished sod desired, is laid in lanes between the row/hill nurseries. An appropriate growing medium is spread an inch or so deep on top of this plastic sheeting. In some cases a grass sod type netting may be inserted in the growing medium to help bind the sod. The ground cover will grow laterally across and into the growing medium underlain by the plastic. Prevented from entering the soil by the plastic sheeting, the roots will grow along the plastic sheeting and quickly bind the growing medium into a sod. This is harvested in pieces or rolls by cutting the ground cover between the roll/hill nurseries and the sod lane along the edges of the plastic. The plastic sheeting can be rolled or lifted with the sod to help protect it in shipping; or it can be left behind, covered with more growing medium, and used time and again for subsequent crops. Except for their being cut back or pruned of lateral growth after each sod crop is harvested, the row/hill nurseries are left intact to be used over and over again to produce more lateral, vegetative growth necessary to produce subsequent sod crops. The method, in comparison to the conventional method of planting ground covers by rooted cuttings one at a time, requires less labor to install, provides instant weed-free cover complete with mulch, and requires less watering and initial care.

DESCRIPTION OF THE INVENTON

Instead of planting or sticking cuttings, rooted cuttings, pieces, seed, etc. into a growth medium in greenhouse flats, my novel process takes advantage of one of the main characteristics of ground covers—namely their capacity to grow or expand laterally. It is this lateral growth that is used to form the sod in the following manner: What will become permanent row/hill nurseries of the ground cover from which a sod is desired are established in the field. The land is plowed, disc harrowed, prepared and graded with bull nose plows much in the same manner as in strawberry hill culture. The rows of hills are arranged approximately 10" to 12" wide, 6" to 8" high, and 18" to 24" on center.

These row/hills of soil will become the permanent nurseries: rooted cuttings, pieces, stolons, tillers, even seed if available, of the ground cover from which a sod is desired are planted in these hills typically 6" to 12" apart.

In the lanes between the row/hill nurseries, polyethylene sheeting or film, 0.5 to 6 mils thick, cut to the same width as is desired for the width of the finished sod, or typically 8 to 12" wide, is unrolled on the soil. Prior to unrolling the plastic, to facilitate drainage, the plastic is drilled with ⅛" to ¼" holes. It was learned from earlier work with grasses that roots will not penetrate holes this size and will not grow into the soil below so as to bind the sod to the soil. The roots will in fact grow around these holes along the surface of the plastic and quickly knit the growing medium into a sod.

A suitable growing medium is placed one inch more or less deep over the plastic sheeting in the lanes between the permanent row/hill nurseries and is contiguous with these nurseries. The particular growing medium used will vary with the particular ground cover being grown. Each ground cover usually has several growing media suitable for its growth and reported in the horticultural literature. These consist typically of widely recognized ingredients such as: peat, sand, perlite, vermiculite, calcined clay, wood chips, sawdust, composted leaves, composted manure, sewage sludge, topsoil, and several others.

It is probably useful, especially with less vigorous types of ground covers, to insert in the growing medium or on top of it or below it a netting of the type commonly used in grass sod production (e.g. Conwed ½ to 1 inch plastic netting). Where economical nettings can enhance the knitting of a sod and in effect speed the time to and the ease of harvesting.

Irrigation, shading, fertilization, disease, insect, and weed controls, winter protection and other cultural techniques are practiced in a manner common to the art of maintaining a plant nursery.

From the permanent row/hill nurseries the ground cover will grow laterally by stolons, runners, rhizomes, and tillers across and into the lanes of plastic sheeting covered with an appropriate growing medium. Prevented from growing into the soil by the plastic sheeting, the roots produced by the lateral growth will run over and along the plastic back into the growing medium, intertwining with the netting if this is used, and binding the growing medium into a sod.

When knitted sufficiently to hold together and therefore to harvest as a sod, the ground cover is cut along the edges of the plastic sheeting in a line between the sod lanes and the permanent row/hill nurseries. This essentially prunes the lateral growth which has grown out from the permanent row/hill nurseries and roots and forms the sod over the plastic sheeting.

The plastic sheeting can be rolled or lifted with the sod as it is harvested to help protect it in shipment or it can be left behind in place, covered with more growing medium, and used over and over again for subsequent crops. Except for their being cut back or pruned of lateral growth after each sod crop is harvested, the row/hill nurseries are left intact to be used over and over again to produce lateral vegetative growth necessary to produce subsequent sod crops.

Just as with a turfgrass sod crop, the ground cover sod pieces or rolls are transported and laid on a carefully prepared and graded site. The new sod is fertilized and watered as in conventional grass sod installations.

Installing a ground cover sod has obvious advantages over the conventional method of planting ground covers by rooted cuttings one at a time: the sod requires less labor to install, produces an instant cover complete with mulch (the growing medium); and, since it has been grown over plastic sheeting and its root system by and large is completely intact, the new sod will root and spread quickly with a minimum of water. In addition the sod obviates the often difficult problem of weed control in a new ground cover bed.

What is claimed is:

1. A method for producing ground cover sods, comprising establishing parallel spaced row/hill nurseries of ground cover plants which spread laterally by stolons, rhizomes, runners, or tillers, placing plastic sheeting or film on the ground in the spaces between said nurseries, covering said sheeting or film with a growing medium enabling rooting therein by the lateral growth from said nurseries, which growth becomes matted to form a sod, harvesting said sod by cutting off said growth in lines along both edges of the plastic film or sheeting, and removing said sod from between said nurseries.

2. A method as in claim 1, wherein the film or sheeting has perforations therein, which perforations are of a size to permit drainage but prevent root penetration.

3. A method as in claim 1, wherein a netting lies in, above, or immediately below said growing medium.

4. A method as in claim 1, wherein after said harvest of sod, plastic sheeting or film is again placed between said nurseries, a growing medium is placed thereon, and, when sod is again formed, said sod is again harvested.

* * * * *